United States Patent
Becker

[15] 3,646,539
[45] Feb. 29, 1972

[54] TRANSMITTING UNIT FOR METER EXTENSION SYSTEM

[72] Inventor: Dale F. Becker, Springfield, Ill.
[73] Assignee: Sangamo Electric Company, Springfield, Ill.
[22] Filed: May 26, 1969
[21] Appl. No.: 829,160

[52] U.S. Cl............................................340/203, 340/325
[51] Int. Cl..........................................................G08c 19/16
[58] Field of Search..........................................340/203, 205

[56] References Cited

UNITED STATES PATENTS

| | | | |
|---|---|---|---|
| 2,084,742 | 6/1937 | Pudelko | 340/205 |
| 2,082,038 | 6/1937 | West | 340/205 |
| 3,103,651 | 9/1963 | Heinecke | 340/203 |

*Primary Examiner*—Thomas B. Habecker
*Attorney*—Johnson, Dienner, Emrich, Verbeck & Wagner

[57] ABSTRACT

A transmitting unit connected to a remote receiver register for supplying direct current pulses to a stepping motor of the register, including a rectifier circuit for converting alternating current to full wave direct current pulses and a switch for producing pulses by reversing the polarity of the current pulses in response to measurement of commodity flow by the meter.

9 Claims, 3 Drawing Figures

INVENTOR
DALE F. BECKER

TRANSMITTING UNIT FOR METER EXTENSION SYSTEM

FIELD OF THE INVENTION

This invention relates to metering apparatus and more particularly to a meter dial extension system for operating an integrating form of meter register located at a position which is remote from the integrating meter to which the register relates.

As illustrative of one particular use, the present apparatus may be employed to operate a readily accessible meter register, for example, on the outside wall of a building which may permit convenient display of the reading of a commodity supply meter which is located within the building itself. Although adapted primarily for use with an electrical watt hour meter or other electrical meter, the invention is also capable of use with other types of meters, such as are used to indicate the integrated flow consumption of various other commodities, particularly gas, water and the like. Accordingly, it is to be understood that the utility of the invention is not to be construed as limited in its application to electric meters, but extends to other meters as well, and particularly to those wherein remote indicator apparatus, is a distinct advantage.

Although most of the more modern homes, apartment buildings and the like have their electrical meters installed outdoors to facilitate meter reading, there are many older installations, particularly within plural dwellings or apartment buildings, which present the problem of "skip readings" and "repeat calls" by the meter reader. Conversion of these older installations to outdoor metering involves extensive revamping and accordingly, the cost factor for conversion is high.

In a copending U.S. Pat. application, Ser. No. 667,214 of Karl Struck, filed Sept. 12, 1967, and assigned to the assignee of this application there is described an inexpensive system which may be readily and conveniently added to an existing electric meter installation in such manner as to permit a readout at a point which is more accessible to the meter reader. The system there disclosed includes a transmitting unit which is mechanically attached to the pintle of the unit's dial of the existing meter register, and a remotely located receiver register, electrically connected to the transmitter, which repeats the reading of the existing meter register at the remote location. The receiver, operated by the transmitter, employs a stepping motor to drive the unit's recording shaft of the remote register only upon reversal of a direct current signal supplied thereto from the transmitter. Accordingly, the transmitter includes a switch operated by rotation of the pintle of the unit's recording dial of the meter connected into the stepping motor circuit by a two-conductor cable for providing a DC signal to the stepping motor which reverses in polarity for each kilowatt hour (or other designated increment of power consumption) so that the dials of the remote register are caused to duplicate and/or to give the same information as would appear on the dials of the meter itself.

The reversing switch includes a cam mounted on the unit's recording pintle of the meter and cantilever mounted spring arms which are serially connected in the stepping motor circuit. These spring arms are arranged on opposite sides of the cam with their free ends engaging the sides of the cam so that as the cam is rotated a circuit is completed in which a diode functions to convert alternating current to a rectified half wave direct current. A filter network is used to smooth out the resulting direct current pulses.

The system described briefly above has provided a number of advantages over prior art systems, including the provision of immunity from the effects of power interruption while requiring only a two-wire circuit for interconnecting the meter and the remote register. Moreover, this arrangement provides that if the interconnecting circuit is broken, short circuited, or otherwise interfered with, the parent meter will be unaffected and will continue to provide accurate readings and the remote register will never indicate a reading greater than the parent meter. Thus, in the case of unauthorized tampering with the wiring or with the remote register itself, the original meter reading is preserved at the meter.

Another important feature is that both the receiver and the modification of the meter to incorporate the transmitter comprise components of simple construction, that are easy to manufacture due to lack of critical tolerances, and in the case of the transmitter can be readily and conveniently installed in an existing meter at considerably less cost than would be required to move the parent register, for example, to a more accessible location.

It is an object of the present invention to provide a transmitting unit for a meter extension system which is more efficient, both electrically and mechanically than transmitting units previously proposed.

SUMMARY OF THE INVENTION

The present invention provides an improved transmitting unit for a meter extension system of the type requiring only a single coil receiver solenoid and a two-conductor cable to interconnect a meter and a remote receiver register. The transmitting unit includes an electrical circuit which provides twice the average power to drive a stepping motor of the remote register as was previously available for meter extension systems of this type. The circuit, comprised of a current rectifier circuit for converting available alternating current to full wave direct current, permits maximum conversion of available power into usable power for the load. A switch reverses the polarity of the direct current each time a quantum of a commodity is measured by the meter. The direct current pulses thus supplied to the stepping motor are more continuous and consequently, operation of the stepping motor is less affected by the intermittancy of the drive currents supplied by the transmitting unit. Moreover, this more efficient drive current is provided without the need for a filter network such as was required in the arrangement disclosed for example, in the application of Karl Struck referenced above.

In addition to improved electrical characteristics, the transmitting unit also has greater mechanical efficiency by virtue of the rotating double pole, reversing switch which is embodied in the present application as a disc, attached to the spindle of the unit's register of the meter, which disc has a conductive material disposed on its upper surface which is engaged by cantilever mounted spring contacts disposed to wipe the conductive surfaces as the disc rotates. There is no ratchet or camming action, and hence, the effects of exerted or frictional forces as translated back to the spindle and thence to the meter disc, are more uniform and the maximum values are less. Accordingly, this meter extension system causes less variation and affect on the true reading of the meter. Moreover, the printed disc is simpler in construction than the cam-type disc required in the above-referenced application.

The use of the improved transmitting unit in accordance with the present invention provides an improved remote metering system wherein the register, particularly the stepping motor thereof, operates more reliably and over a greater separation from the transmitting unit.

Briefly, the meter extension system includes a register having a stepping motor adapted to be rotated through a portion of a full turn each time a pulse of direct current which has a polarity in reverse to the polarity of the preceding pulse is fed to the motor, and a transmitting unit for feeding direct current pulses to the motor. The transmitting unit includes a circuit for converting the alternating current available at the meter to full wave direct current and a commutating reversing switch comprised of a disc having conductive material disposed on its flat upper front surface mounted on the pintle of the unit's register of the meter and cantilever mounted contact arms serially connected in the circuit and extending into contact with conductive portions of the disc which complete the circuit between the transmitting unit and the receiver register. As the disc is rotated, the contact arms engage different conductive portions reversing the circuit connections so as to reverse the polarity of the current pulses applied to the stepping motor. Thus, each time the meter measures a predetermined amount of a commodity, the disc is revolved a portion of a full turn reversing the circuit connections and reversing the polarity of the voltage applied to the motor causing the motor to rotate through a like portion of turn. The receiver includes a register, operated by the stepping motor, which indicates the number of turn portions and thus, the amount of the commodity measured.

Other advantages and features of the invention will become apparent from the following detailed description of the invention, which will now be described in connecting with the drawings accompanying this application.

BRIEF DESCRIPTION OF THE DRAWINGS

Referring now to the several views wherein like parts are identified by like reference numerals, the invention will be described in connection with FIGS. 1–3.

DESCRIPTION OF A PREFERRED EMBODIMENT

Figure 1:
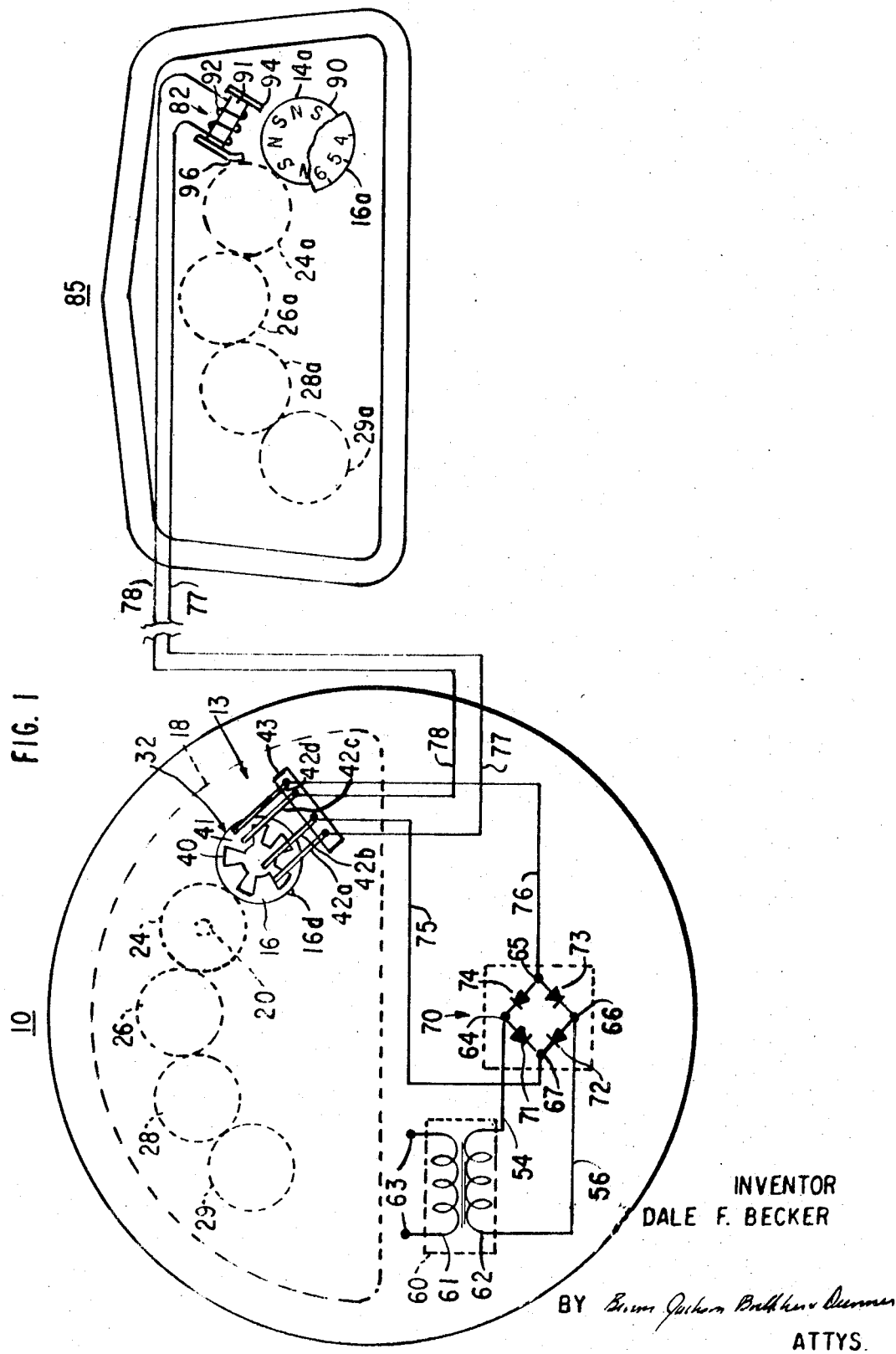
FIG. 1 is a schematic view of a meter extension system, according to the invention, showing a transmitting unit including a transformer, a bridge rectifier, and a reversing switch installed in the meter, and a remote register connected to the transmitter which includes a stepping motor adapted to rotate the unit's recording shaft of the remote register.

With reference to FIG. 1, there is shown a main commodity supply meter 10 of conventional construction, for example, which may comprise a single phase kilowatt hour meter used for measuring the consumption of electrical power which a load draws from a power source. As is well known in the art, such meters are commonly provided with a meter disc (not shown) which is caused to rotate by reason of the interacting magnetic fields from coils provided in the load line and from the current induced in the disc by the coils. The meter disc is mechanically coupled to a shaft or pintle 14 (FIG. 2) on which would normally be carried a pointer for the meter unit's dial 16 on the faceplate 18 of the meter. The pointer carried by shaft 14, as the shaft rotates with the meter disc relative to dial 16, would indicate the kilowatt hours of electrical energy or power which the meter disc is measuring as drawn by the load from the power source. Commonly, shaft 14 rotates 36° or 1/10th of a turn for each kilowatt hour measured by the meter disc. Also shaft 14 is intercoupled by a gear train in a one-to-ten ratio with an adjacent shaft 20 of tens dial 24 such that each time that shaft 14 is rotated by the meter disc through a full turn it will have rotated tens dial shaft 20 1/10ths of a turn.

This one-to-ten ratio carryover is transmitted successively from the tens dial 24 to the hundreds dial 26, and thence to the thousands dial 28 and ten thousands dial 29. A meter such as described is of conventional construction and is well known in the art.

In accordance with the invention, the meter 10 is modified by incorporating a transmitting unit 12 (FIG. 2) into the meter for operating a receiver 85, located at a position that is remote from the meter. These modifications include substituting a disc 32 for the unit's pointer, mounting a terminal block 43 including four spring contact members 42a–42d on the faceplate 18 of the meter, and mounting a transformer 60 and a bridge rectifier circuit 70 within the meter housing. The transmitting unit 12 supplies direct current to the receiver 85 to drive a stepping motor 82 which consists of a disc magnet 90 and a solenoid 92. The current is reversed in polarity by a reversing switch 13 of transmitting unit each time a predetermined quantity of a commodity is measured by the meter and accordingly, the stepping motor is rotated a step each time the polarity of the current is reversed.

Figures 2, 3:
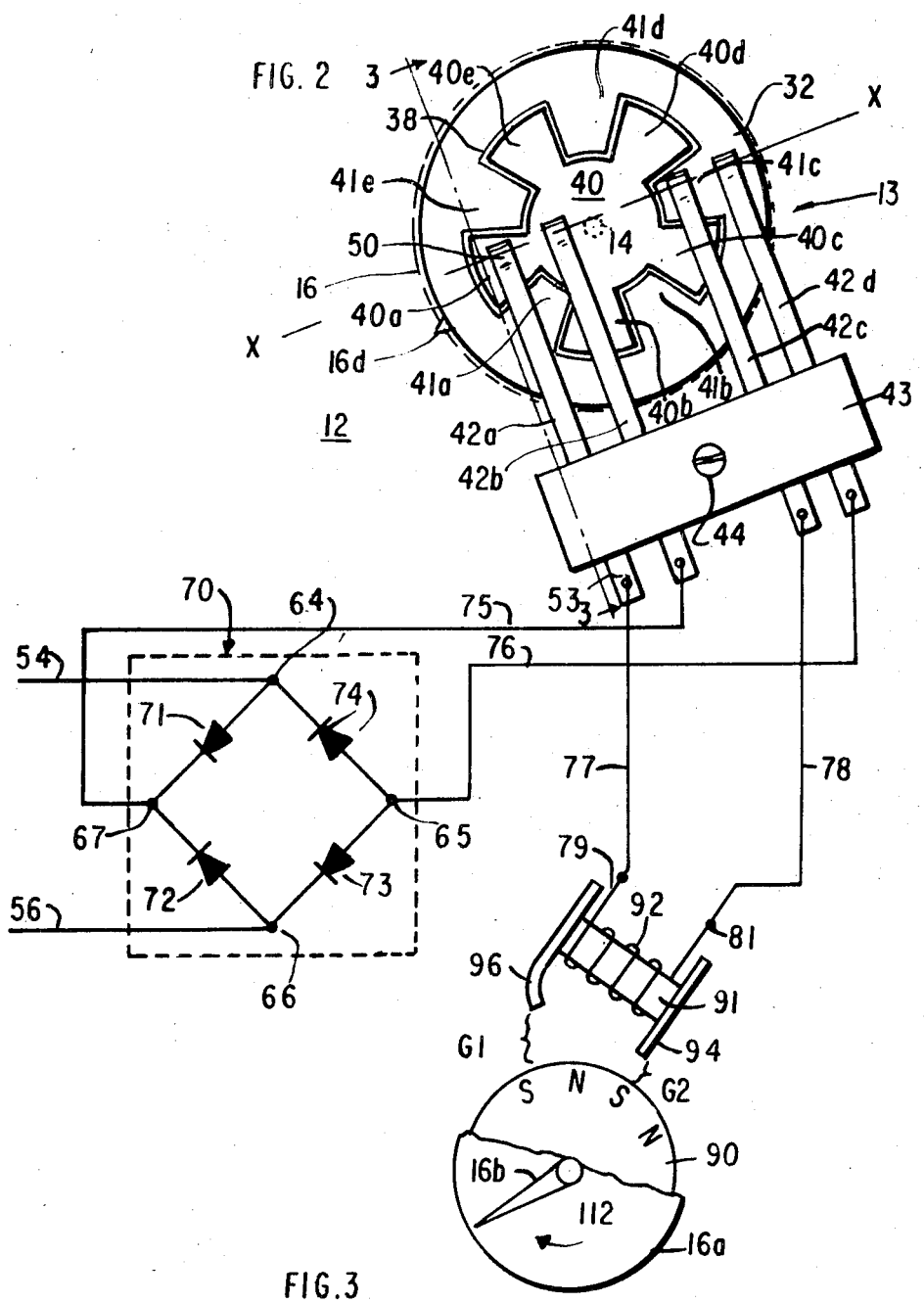
FIG. 2 shows, on a larger scale, the reversing switch and bridge rectifier of the transmitting unit and the circuit which connects the output thereof to the stepping motor of the remote register.
FIG. 3 is a sectional view taken along line 3—3 of FIG. 2.

The reversing switch 13 is comprised of the disc 32 and the spring contact members 42a–42d. The disc 32 is attached to the unit's recording pintle 14 of the meter 10 and is adapted for rotation with the pintle in accordance with the flow of the commodity being measured. The disc includes a pointer 16d which indicates the angular position of the disc. The disc, shown in an enlarged view in FIG. 2 and in a sectional view in FIG. 3, is of an insulating material and has conductive portions comprising inner and outer contact elements 40 and 41, respectively, printed on the face of the disc 32 by techniques known in the art. The inner contact element 40 has a flat circular central base portion from which radiate five inner contact segments 40a, 40b, 40c, 40d and 40e (See FIG. 2), which extend toward the periphery of the disc. The outer contact element 41 is in the form of a flat outer ring having five outer contact segments 41a, 41b, 41c, 41d and 41e, extending inwardly toward the center of the disc in interdigitated relationship with the outwardly extending segments.

Interposed between the adjacent edges of the inner and outer segments are lines of insulation 38, unprinted portions of the upper surface of the disc 32. These separator lines of insulation clearly set off the inner and the outer conductive portions defining two discrete conductive areas on the face of the disc 32.

Four parallel spring contact blades 42a, 42b, 42c and 42d are cantilever mounted on the face plate 18 of the meter 10 by a terminal block 43 and extend into contact with the upper surface of disc 32. As can best be seen in FIG. 3, the terminal block 43 is secured to the face plate by a screw 44 which threads a tapped hole provided in the faceplate. Locating studs 46 and 47, provided on the underside of the terminal block 43, are inserted in suitable holes 48 and 49 provided in the faceplate 18 and serve to position the terminal and the contact blades carried thereby relative to the disc 32. The contact blades maybe molded into the terminal block 43.

The contact blades are formed from an electrically conductive material suitable for making the wiping-type contact required in this application. Moreover, the contact blades are of sufficient resilience as to maintain pressure contact with the surface of the disc 32 as it rotates. It is pointed out that for ease of manufacture, the conducting areas on the disc are formed by printing the whole face of the disc with conductive material and then selectively etching away portions of the conductive surface to form the insulating separator lines by exposing underlying portions of the insulative disc surface.

Each contact blade, such as blade 42a, includes a portion 50 having a substantially U-shaped configuration which provides curved surfaces 51, 52 on the portion of the blade which wipes the surface of the disc 32 to minimize friction and prevent the contact blades from retarding rotational movement of the disc as the blade wipes across the insulative boundary 38. The contact blades each further include a terminal portion, such as portion 53 of blade 42a, by which the reversing switch is connected in the circuit.

The contact portions of the spring contact blades, such as portion 50 of blade 42a, establish wiping engagement with the conductive segments of disc 32 along a transverse line X—X extending diametrically across the face of the disc. Two of the contact blades 42a–42b engage the disc along line X—X on one side of the center of the disc and the other two contact blades engage the disc along line X—X on the other side of the center of the disc. In accordance with the angular position of the disc, as shown in the drawings, contact blade 42b is shown to make continuous engagement with the center portion of the inner contact element. Contact blade 42d is shown to maintain continuous engagement with the ring portion of outer contact element 41. The remaining contact blades 42a and 42c provide the switching function by alternately engaging the segmented portions of the contact elements 40 and 41 as the disc is rotated.

In the drawings, contact blade 42a is shown engaging segment 40a of the inner conductive element 40 and contact blade 42c is shown engaging segment 41c of outer conductive element 41. Thus, conductive element 40 interconnects blades 42a and 42b, and conductive element 41 interconnects blades 42c and 42d. As the disc 32 is rotated, clockwise, blades 42b and 42d will remain in contact with elements 40 and 41, respectively; however, blades 42a and 42c will wipe across the surface of segments 40a and 41c, respectively, then engage the insulative separation layer 38, momentarily opening up the circuit previously formed, and then, as the disc continues to rotate beneath the contact blades, blades 42a and 42c will engage the next adjacent conductive areas, 41a and 40d, respectively. The resultant switching action will cause two different circuit path portions to be completed with blade 42a now connected to blade 42d through conductive element 41, and blade 42c now connected to blade 42b through conductive element 40.

As will be shown, the reversing switch thus provided is serially connected in the circuit which connects the stepping motor of the remote register to a source of direct current pulses, and the switching function is used to reverse the terminals of the conductors which interconnect the transmitting unit and the receiving unit (or register) so that the polarity of the current applied to the stepping motor is reversed, permitting the motor to step.

Referring again to FIG. 1, it will be seen that the transformer 60 comprises a primary coil 61 and a secondary coil 62. In FIG. 1, a pair of conductors 63 connect the primary coil 61 of the transformer to a continuously available alternating current supply. In the illustrated application of the invention to an electric watt hour meter, terminals connected to the main line will be available within the meter housing itself. Thus, it will be convenient to supply conductors 63 with spade clips by which the conductors may be conveniently connected to the terminals. Since the system can be operated at 12 volts and low primary current, transformer 60 is of the stepdown type to provide a voltage at the secondary terminals that is reduced from the magnitude of the supply voltage. One side of the secondary coil 62 of the transformer is connected to a junction 64 of a four diode bridge circuit 70 and the other side of the transformer secondary is connected to a second junction 66 of the bridge circuit. The bridge circuit at its output junctions 65 and 67 provides full wave rectification of the alternating current supplied to the input junctions 64 and 66 via conductors 63.

The rectifier bridge circuit 70 has four arms connected in ring fashion and defining four junctions 64–67. The arms between the junctions are represented by four diodes 71–74. Junctions 64 and 66 are energized by alternating current from the secondary coil 62 of the transformer and by virtue of the four diode bridge circuit, full wave, pulsating direct current is provided at junctions 65 and 67 which serve as the output terminals of the bridge circuit. Conductors 75 and 76 connect bridge output terminals 65 and 67 to blades 42b and 42d, respectively. Conductors 77 and 78 connect blades 42a and 42c to the solenoid 92 of the stepping motor 82 of the remote register.

The remote register or receiver 85 comprises a plurality of dials 16a, 24a, 26a, 28a and 29a, which correspond to meter dials 16, 24, 26, 28 and 29. The pointer-bearing shafts of dials 16a, 24a, 26a, 28a, and 29a are all linked together by appropriate gear ratios such that for each complete revolution of the pointer (not shown) of dial 16a, the pointer (not shown) of dial 24a will rotate 1/10th of a revolution and for each complete revolution of the pointer of dial 24a, the pointer not shown of dial 26a will rotate 1/10th of a revolution and for each complete revolution of pointer of dial 26a, the pointer of dial 29a will rotate 1/10th of a revolution. Shaft 14a of dial 16a is driven by stepping motor 82 which is responsive to direct current pulses to advance the units dial pointer each time the polarity of the pulses is reversed by the reversing switch of the transmitting unit. The reading of dial 16a of the remote register is then synchronized with the reading of dial 16 of the meter and accordingly, the remaining dials of the register will have readings identical to the corresponding dials of the meter.

The rotor of the stepping motor is a solid disc 90, of a magnetic material, such as Indox I, attached to the shaft 14a of the unit's dial. The disc magnet is provided with 10 poles of alternating polarity around its circumference. These 10 poles correspond in number and in location to the 10 numerals on the units recording dial 16a. The field structure of the motor comprises a solenoid 92 having pole pieces 96 and 94 at its two ends disposed adjacent the periphery of the disc magnets, each with an airgap therebetween and the periphery of the disc 90, the pole pieces 96 and 94 being separated a distance apart so as to span one and one-half times the pole span of the disc 90 so that one pole will predominate over the other to index and determine the position of the disc 90 both when the coil 92 is energized and when it is not energized. A similar stepping motor is disclosed in the application, Ser. No. 667,214, of Karl Struck, referenced above, and additional details concerning the structure of the stepping motor not relevant to this discussion may be obtained from this reference.

The solenoid coil 92 is alternately energized by pulses of direct current from the transmitting unit 12 and the polarity of the pulses of direct current is reversed each time the meter disc measures a kilowatt hour of power drawn across the load line wherefore the solenoid pole pieces 94, 96 under the influence of the transmitting unit, cause the magnetic disc 90 to move an angular distance equal to the spacing between its poles each time the pole pieces 94, 96 of the solenoid reverse their polarity. As noted above, this angular distance corresponds to the angular spacing of the numerals on dial 16a wherefore the pointers on the dials of the register index correspond to the position of the pointers on the dials of the parent meter.

Referring again to FIGS. 1 and 2, as the magnetic disc 90 is shown, solenoid coil 92 would have been last energized to make pole piece 96 a south pole and pole piece 94 a north pole. For a positive half cycle of alternating current applied to conductors 63, the rectified current flowing in conductor 77 which energizes solenoid coil 92 is positive with respect to conductor 78. This current is conducted over a circuit path from the secondary winding 62 of input transformer 60, terminal 64 of the bridge circuit 70, diode 71, conductor 75, to blade 42b, and through conductive portion 40a of disc 32 to blade 42a, conductor 77 to terminal 79 of coil 92, and from terminal 81 via conductor 78 to blade 42c, and through conductive portion 41c of disc 32 to blade 42d and terminal 65 of diode bridge 70 via conductor 76, through diode 73 to the second terminal of the secondary winding 62 of transformer 60. During the negative half cycle of applied current, the current would be passed by diodes 74 and 72 instead of diodes 71 and 73; however, the polarity of the current in conductor 77 will remain positive with respect to conductor 78.

As disc 32 is rotated, clockwise, under the stationary blades 42a–42 in response to measurement of the flow of electricity by the meter, blades 42a and 42c will first disengage conductive portions 40a and 41c respectively, and move onto insulative portions 38 of the disc face so as to interrupt the circuit. With the circuit interrupted, the south pole of the disc magnet 90 will remain attracted to pole 94 due to its proximity and so hold the disc in this position wherefore pointer 16c will not move. Any forces tending to align pole piece 96 with a pole on the magnetic disc 90 will be less due to the greater airgap which spaces it from the nearest pole of disc 90.

As the disc, 32 is rotated further clockwise in response to the drive action of the meter, blade 42a will contact conductive portion 41a and simultaneously, blade 42c will contact portion 40d. In this position the reversing switch 13 connects conductor 75 to conductor 78 and conductor 76 to conductor 77 so that subsequent direct current pulses passed to coil 92 from terminals 65 and 67 of the bridge will be reversed in polarity. Consequently, pole piece 94 will become a south pole, and pole piece 96 will become a north pole. When this occurs, by reason of the phenomenon that like magnetic poles tend to repulse each other and opposite poles to attract, solenoid 92 will cause magnetic disc 90 to turn shaft 14a. The disc might be driven in either direction, depending on the equilibrium of its mounting. However, pole 96 now being a north pole will tend to attract the closest south pole on the magnetic disc 70 and repel the nearest north pole so that the disc 90 will continue to turn in a clockwise direction as indicated by arrow 112. The pole with the larger gap therefore determines the direction of rotation of the disc 90 and the pole piece with the narrower gap determines the alignment of the disc and therefore the indexing of pointer 16b with the numerals on dial 16a.

As the disc 32 continues to rotate, the circuit will be again interrupted by reason of the blades engaging insulating and alternate conductive portions of the disc 32. Thus, as disc 32 rotates under the direction of the meter as it measures power consumption, connections between the output of diode bridge 70 and the solenoid 92 are reversed each time disc 32 rotates 1/10th of a revolution. The pulsating direct current available at the output terminals 65 and 67 of the bridge rectifier 70 for application to the solenoid 92 is alternately applied first in one direction and then in the opposite direction so as to alternately make pole piece 94 a north pole and then a south pole enforcing rotation of disc 90 in steps, each step corresponding to the angular displacement of the numerals on the units dial 16b of the register 85.

I claim:

1. In a meter extension system, a meter having measuring means for measuring quantums of a commodity and a shaft rotated by said measuring means in measuring the quantums, transmitter means, including a rotatable switch member mounted for rotation by said shaft and driven to successively different positions with each measurement of a quantum of a commodity, which switch member has first and second discrete conductive areas on at least one planar surface thereof, input means for applying a potential difference between said first and second discrete areas, at least a first and a second contact member mounted to wipingly engage said first and second conductive areas whereby the potential difference appears between said first and second contact members, an output path including at least a pair of conductors connected to said first and second contact members, said first and second conductive areas on said rotatable switch member being arranged in a pattern to reverse the direction of current flow over said first and second contact members at each successive position of said switch member, and register means connected to said output path for registering each such current flow reversal to thereby register the quantums of the commodity measured by the meter measuring means.

2. A transmitting unit in a meter extension system as claimed in claim 1 wherein said rotatable switch member comprises a disc of an insulating material having conductive portions disposed thereon in a pattern defining on said surface a conductive center portion with contact segments extending outwardly therefrom toward the periphery of said disc and a conductive outer portion extending around the periphery of said disc and having contact segments extending inwardly toward the center of said disc in an interdigitated relationship with said outwardly extending segments and insulated therefrom by insulating portions of said disc.

3. A transmitter unit in a meter extension system as claimed in claim 2 in which said input means includes two further contact members one of which engages said conductive center portion, and the other one of which engages said conductive outer portion and in which said first and second ones of said contact members are mounted to successively engage said inwardly and said outwardly extending contact segments, as said disc is rotated to move the interdigitated conductive portions therepast.

4. A transmitting unit in a meter extension system as claimed in claim 3, wherein there are five inwardly extending contact segments and five outwardly extending contact segments on said disc disposed to be engaged by said first and second contact members in each revolution of said disc, the first and second contact members being disposed to engage different ones of said conductive portions at each position of said disc.

5. In a meter extension system, a meter having measuring means for measuring quantums of a commodity and a shaft rotated by said measuring means in measuring the quantums, transmitter means including a rotatable switch member mounted for rotation by said shaft and driven to successively different positions with each measurement of a quantum of a commodity, which switch member has first and second discrete conductive ares on a common surface thereof, input means including first and second input contact members mounted to wipingly engage said first and second conductive areas, respectively, for applying a potential difference between said first and second areas, at least a first and second output contact member mounted to wipingly engage said first and second conductive areas respectively at a first position of said switch member, and to respectively engage said second and first conducting areas as said switch member is rotated to a second one of said positions, an output path including a pair of conductors connected to said first and second output contact members, whereby the direction of current flow over the conductors of said output path is reversed as said switch member rotates from said first position to said second position, and register means connected to said output path for registering such current flow reversal to thereby register the quantums of the commodity measured by the meter measuring means.

6. A meter extension system as set forth in claim 5 in which said first and second conductive areas are disposed on said common surface in a pattern to provide a reversal of the direction of current flow over said output conductors with movement of said rotatable switch member to each successive position.

7. A meter extension system as set forth in claim 5 in which said first and second input contact members are connected to the output of a direct current source.

8. For use in a meter extension system including a meter having measuring means for measuring quantums of a commodity and a shaft rotated by said measuring means in measuring the quantums, transmitter means comprising a rotatable switch member mounted for rotation by said shaft and driven to successively different positions with each measurement of a quantum of a commodity, which switch member has first and second discrete areas of conduction thereon, input means including first and second input contact members mounted to wipingly engage said first and second conductive areas, respectively, for applying a potential difference between said first and second discrete areas, at least a first and second output contact member mounted to wipingly engage said first and second conductive areas respectively at a first position of said switch member and to respectively engage said second and first conductive areas as said switch member is rotated to a second one of said positions, and an output path including at least a pair of conductors connected to said first and second output contact members, said first and second conductive areas being arranged in a pattern on said rotatable switch member to provide a reversal of the current flow over said first and second output contact members in each successive position of said switch member.

9. For use in a meter extension system including a meter having measuring means for measuring quantums of a commodity, transmitter means having a rotatable switch member driven to successively different positions by said measuring means with each measurement of a quantum of a commodity, which switch member has first and second discrete conductive areas arranged in a predetermined pattern on at least one planar surface thereof, input means for applying a potential difference between said first and second discrete areas, and output path means including at least first and second contact members mounted to wipingly engage said first and second conductive areas, said conductive areas being disposed on said switch member in a pattern relative to said first and second contact members to effect double pole, double throw switching between said input and output means with movement to each successive position of said switch member and thereby a reversal in the current flow over said first and second contact members.

* * * * *